ANALOG TO DIGITAL DIVIDER APPARATUS

Filed May 31, 1961 3 Sheets-Sheet 1

WITNESSES
Leon J. Laza
Leon M. Garman

INVENTORS
Allen B. Walls and
James E. Thompson
BY R.W. Brodahl
ATTORNEY

July 13, 1965 A. B. WALLS ETAL 3,194,950

ANALOG TO DIGITAL DIVIDER APPARATUS

Filed May 31, 1961 3 Sheets-Sheet 3

United States Patent Office 3,194,950
Patented July 13, 1965

3,194,950
ANALOG TO DIGITAL DIVIDER APPARATUS

Allen B. Walls, Baltimore, and James E. Thompson, Severna Park, Md., assignors to Westinghouse Electric Corporation, East Pittsburgh, Pa., a corporation of Pennsylvania Filed May 31, 1961, Ser. No. 113,712
3 Claims. (Cl. 235—154)

The present invention relates to digital to analog converting apparatus, and more particularly to analog to digital divider apparatus for obtaining a digital number proportional to the quotient of two analog signals.

It is often required to normalize two analog voltages and obtain the quotient of these voltages in a digital number form. Generally, in the prior art, this is accomplished by first converting both analog voltages into digital form, and then performing the division digitally in a computer. Because of widely varying analog signal amplitudes, it is required that a large number of information bits be supplied in order to obtain the necessary precision over the total range. Also it is required to provide accurate reference voltage supply in the digital conversion of the analog voltage. Furthermore, since the analog signals must be converted into digital information, the converting time requirement is substantial. In view of these problems:

It is an object of the present invention to provide a new and improved analog to digital divider.

It is a further object of the present invention to provide a new and improved analog to digital divider which provides a digital number proportional to two analog signals without first converting the analog signals into digital form.

It is a further object of the present invention to provide an analog to digital divider in which a digital number proportional to the quotient of two analog numbers is obtained while requiring only one converting operation.

The present invention broadly provides an analog to digital converter wherein a digital quotient signal which is established in a quotient register is multiplied by an analog divisor signal in a digital to analog multiplier to provide a signal which is the product of the quotient digital signal and the divisor analog signal. The product signal is compared with an analog dividend signal in a comparing circuit which in turn supplies an error signal that is applied to the quotient register to change the state of the quotient register in a manner tending to correct the digital quotient signal and so change the error signal; so that, the resulting digital signal after completion of the comparison routine is proportional to the quotient of the two analog signals.

These and other objects will become more apparent in the following detailed description and accompanying specification, considered in view of the drawings in which.

Figure 1:
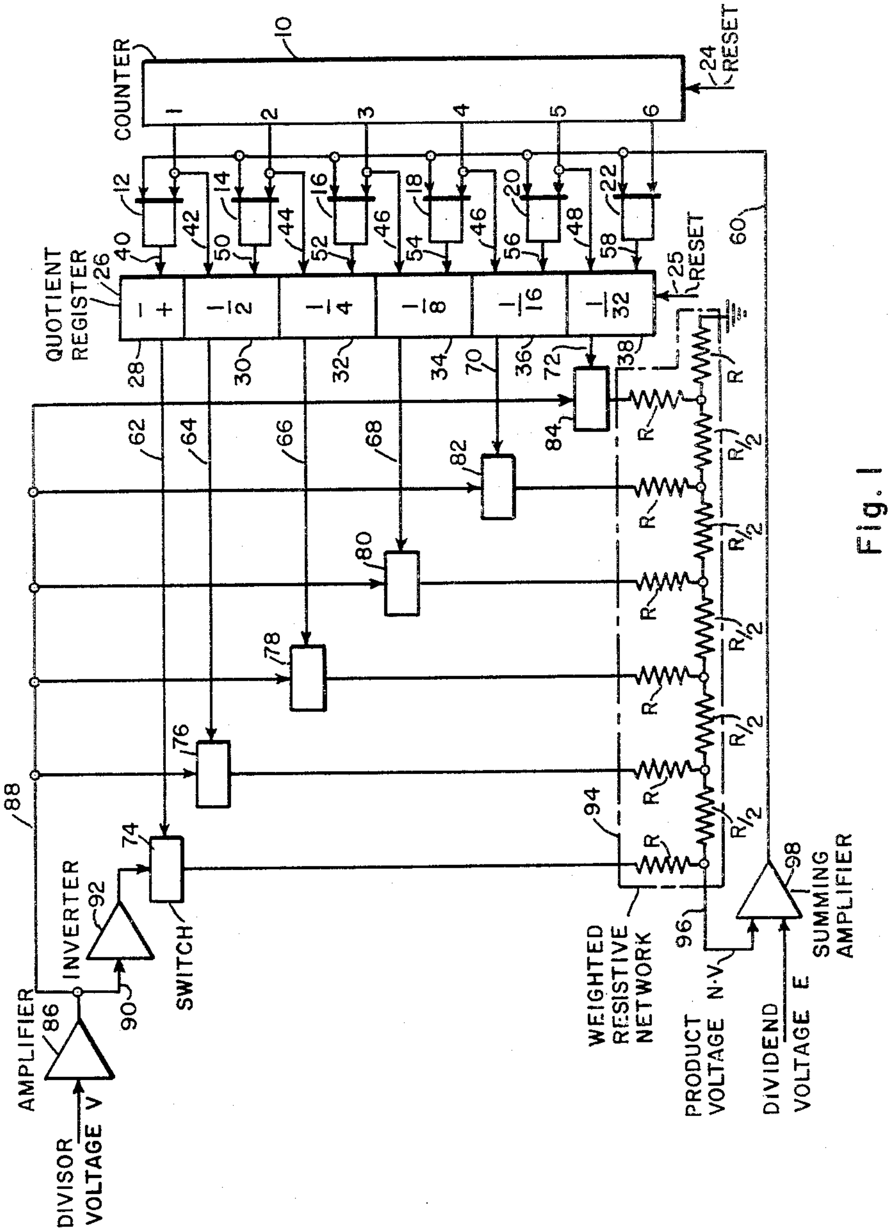
FIGURE 1 is a schematic-block diagram of one embodiment of the present invention.

Referring to FIG. 1, a counter 10 is shown having outputs 1, 2, 3, 4, 5 and 6. Binary ONES or positive signals are provided at the terminals 1 through 6 in a time sequence. The AND gates 12, 14, 16, 18, 20 and 22 receive the outputs from counter 10 as one of their inputs. A reset input 24 is provided for the counter 10. A quotient register 26 comprises a plurality of binary flip-flop circuits including sign flip-flop 28, one-half flip-flop 30, one-fourth flip-flop 32, one-eighth flip-flop 36, one-sixteenth flip-flop 36, and one thirty-second flip-flop 38. The upper input terminals 40, 42, 44, 46, 47 and 48 of the individual flip-flop circuits of the quotient register 26 are set inputs and the lower input terminals 50, 52, 54, 56 and 58 are the reset input terminals. It is noted that the sign flip-flop 28 has only a set input 40 which is taken from the output of AND gate 12. The set inputs to terminals 42, 44, 46, 47 and 48 are supplied from the outputs 1, 2, 3, 4, 5, respectively, of the counter 10. A reset input 25 is provided for the quotient register 26. The reset inputs 24 and 25 may be used to restart the cycle of operation. The other input for the AND gates 12, 14, 16, 18, 20 and 22 is supplied from the feedback loop through lead 60. The outputs of the AND gates 14, 16, 18, 20 and 22 supply the reset input to the flip-flop circuits 30, 32, 34, 36 and 38 respectively. The flip-flop circuits 28, 30, 32, 34, 36 and 38 are so designed that a ONE at its set input will supply a ONE at its output. When a ONE is then received at its reset input the output is then reset to a zero. The AND gates provide a ONE output when a ONE is received at each of its inputs. The outputs 62, 64, 66, 68, 70 and 72 of the individual flip-flop circuits of the quotient register 26 are connected to the switches 74, 76, 78, 80, 82 and 84 respectively. An analog divider voltage V is applied to amplifier 86 which amplifies and inverts the polarity of the input analog voltage V. The output of the amplifier 86 is applied through lead 88 to the switches 76, 78, 80, 82 and 84, respectively. Also the output of the amplifier 86 is applied through lead 90 to the inverter 92 which inverts the polarity of the voltage applied thereto. The output of the inverter 92 is then applied to the switch 74. The switches are so designed that when a ONE is received at one terminal the switch then permits the analog signal applied to the other terminal to pass to the output. When a ZERO is received at one terminal, the output voltage is zero. These switches may be relays, controlled rectifiers, or any other switch device well known in the art. The output terminals of the switches 74, 76, 78, 80, 82 and 84 are respectively connected to the resistors R of the weighted resistive network 94. Between the resistors R are connected resistors $R/2$ having one-half the value of resistance of the resistors R. The output terminal 96 of the weighted resistive network 94 is connected to one input of the summing amplifier 98. The other input of summing amplifier 98 is supplied with an analog dividend voltage E. The summing amplifier 98 takes the algebraic sum of the inputs and quantizes it to provide a binary ONE or ZERO output depending upon the magnitudes of its inputs. The output of the summing amplifier 98 is applied through feedback loop 60 to the AND gates.

Figure 2A:
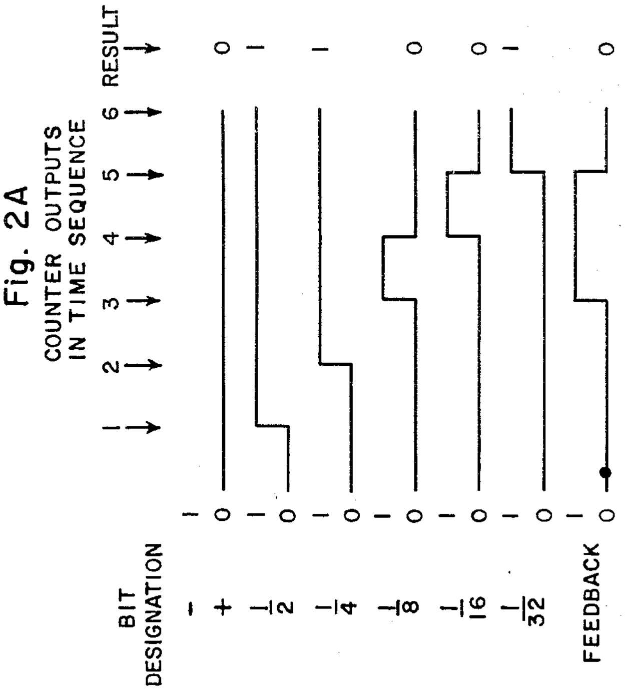
FIGS. 2A and 2B are waveform diagrams to aid in the explanation of the operation of the embodiment of FIG. 1.
Figure 2B:
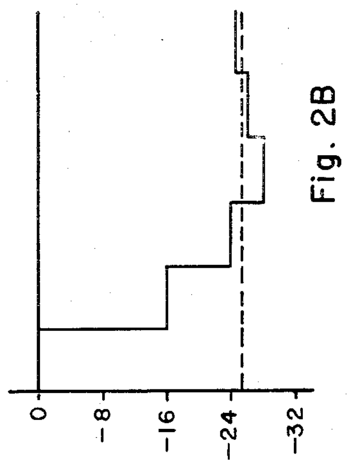

To aid in the explanation of the operation of the analog to digital divider of FIG. 1 reference should also be made to FIGS. 2A and 2B. It should be noted that the output of the weighted resistive network 94 is the product of the divisor voltage V and the digital number N in the quotient register 26. As the function of weighted resistive networks in analog to digital multiplier circuit is well known in the art it will not further be discussed herein. See Analog-Digital Conversion Techniques, Alfred K. Susskind, The Technical Press of Massachusetts Institute of Technology and John Wiley and Sons., Inc., 1957, chapter 5.

For purposes of explanation, assume that the quotient register starts in its reset position, i.e., there is no number in the digital form. The counter 10 provides ONE outputs in time sequence on its output terminals 1 through 6. The ONE outputs are only of sufficient length to set the flip-flops of the quotient register 26, and there is sufficient time between outputs to avoid false resetting of the flip-flops. Also assume that the dividend voltage E is +25.1 volts and that the divisor voltage G is +32 volts. The steps of operation then are:

(1) At the time sequence 1, the counter 10 provides a ONE at output terminal 1 as previously described. The ONE is received at the set terminal 42 of the one-half flip-flop 30 which is thereby set to apply a ONE to the switch 76. The switch 76 is thus actuated to allow the divisor voltage V to pass therethrough to the weighted resistive network 94, which attenuates this voltage to provide an output of —16 volts on lead 96. The summing amplifier 98 quantizes the signal applied thereto to provide a ZERO if the algebraic sum of its inputs is positive and a ONE if the algebraic sum of its inputs is negative. As the algebraic sum of the dividend voltage E and the product voltage N times V is positive a ZERO is provided in this case, and the sign of the quotient N is determined as positive. If the dividend voltage E had been negative, the summing amplifier 98 would have provided a ONE to the AND gate 12, which would have caused the AND gate 12 to provide a set signal to the sign flip-flop 28 as a ONE would have also been applied from the counter at this time to the AND gate 12. The setting of the sign flip-flop 28 would have provided a signal to actuate the switch 74, which would have in turn allowed an inverted divisor voltage V to be passed thereto. The weighted resistive network would have then passed a voltage of 32—16 or a positive 16 volts to the summing amplifier 98; since the product output N times V of the weighted resistive network 94 and the dividend voltage E are of different polarities the summing amplifier 96 can converge, the divider circuit will then function an hereinafter explained. However, if the divisor voltage V were of a negative polarity it should be noted that the inputs of summing amplifier 98 would not converge and coverage, the divider circuit will then function as herein the example both divisor and dividend voltages are assumed positive; thus the sign flip-flop would remain in its reset or positive condition.

(2) At time sequence 2 the counter 10 provides a ONE to the set input 44 of the one-fourth flip-flop 32 which in turn provides an actuating signal to switch 78 to allow the divisor voltage V to pass into the weighted resistive network 94. As the one-half flip-flop 30 is in its set position the switch 76 also remains actuated and the divisor voltage V can pass therethrough. The output of the weighted resistive network on lead 98 is then ¾ times V or —24 volts, as shown in FIG. 2B. The algebraic sum of the inputs of the summing amplifier 98 is still positive thus a ZERO is fed back to the AND gates over lead 60 so that none of the gates pass a signal to reset the flip-flops of the register 26.

(3) At time sequence 3, a ONE is provided by the counter 10 to the set terminal 46 of the one-eighth flip-flop 34, which provides an activating signal to the switch 80 and thus allows the divisor voltage V to pass therethrough. The output on lead 96 of the weighted resistive network is then ⅞ of the divisor voltage V or —28 volts. As this product voltage exceeds negatively the dividend voltage E the summing amplifier 98 now provides a ONE in the feedback loop 60.

(4) At time sequence 4, a ONE is provided by the counter 10 to the set terminal 46 of the one-sixteenth flip-flop 36 which provides an output signal to activate switch 82. Also, however, the counter 10 provides through output terminal 4 an input to the AND gate 18 which also has a ONE input from the feedback loop 60, thus the one-eighth flip-flop 34 is reset, and no longer provides a ONE output, as is shown in FIG. 2A. The one-half and one-fourth flip-flops remain set, however, as there are now no outputs from counter terminals 2 and 3. The switches 76, 78 and 82 are thus responsive to pass the divisor voltage V to the weighted resistive network 94, whose output now is $^{13}/_{16}$ times the divisor voltage V or —26 volts. Because the algebraic sum of the inputs of the summing amplifier 98 is still negative, the summing amplifier again provides a ONE to the feedback loop 60.

(5) At the time sequence 5, a ONE is provided by the counter 10 to the set input 48 of the one-thirty-second flip-flop 38 which provides a ONE output to activate switch 84. A ONE being on the feedback loop 60 causes the AND gate 20 to provide a reset signal to the one-sixteenth flip-flop 36. The switches 76, 78 and 84 are now responsive to allow the divisor voltage V to pass therethrough to the weighted resistance network 94. The output of the weighted resistive network on lead 96 is then $^{25}/_{32}$ of the divisor voltage V or —25 volts; this causes summing amplifier 98 to provide a ZERO to the feedback loop 60 as the algebraic sum of the product signal N times V and the dividend voltage E is positive. The digital number now set in the quotient register is $^{25}/_{32}$.

(6) At time sequence 6, a ONE is provided by the counter 10 to one input of the AND gate 26, however, as a zero is on the feedback loop 60 the AND gate is non-responsive to provide an output to reset the one-thirty-second flip-flop 38. Within the accuracy of the quotient register then the quotient in digital form of the dividend voltage E in the divisor voltage V is $^{25}/_{32}$. The resultant settings in the quotient register 26 are shown in FIGURE 2A.

Figure 4A:
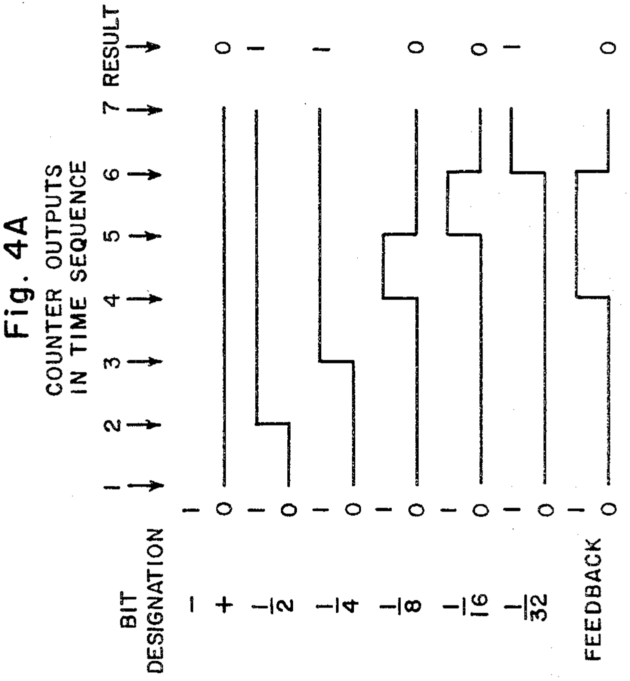
Figure 4B:
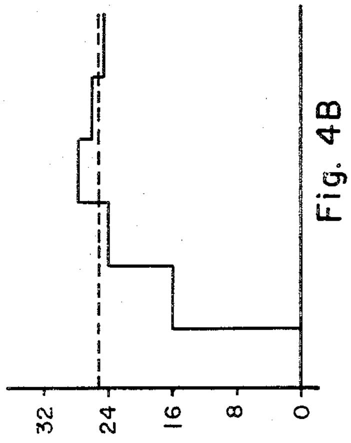
Figure 3:
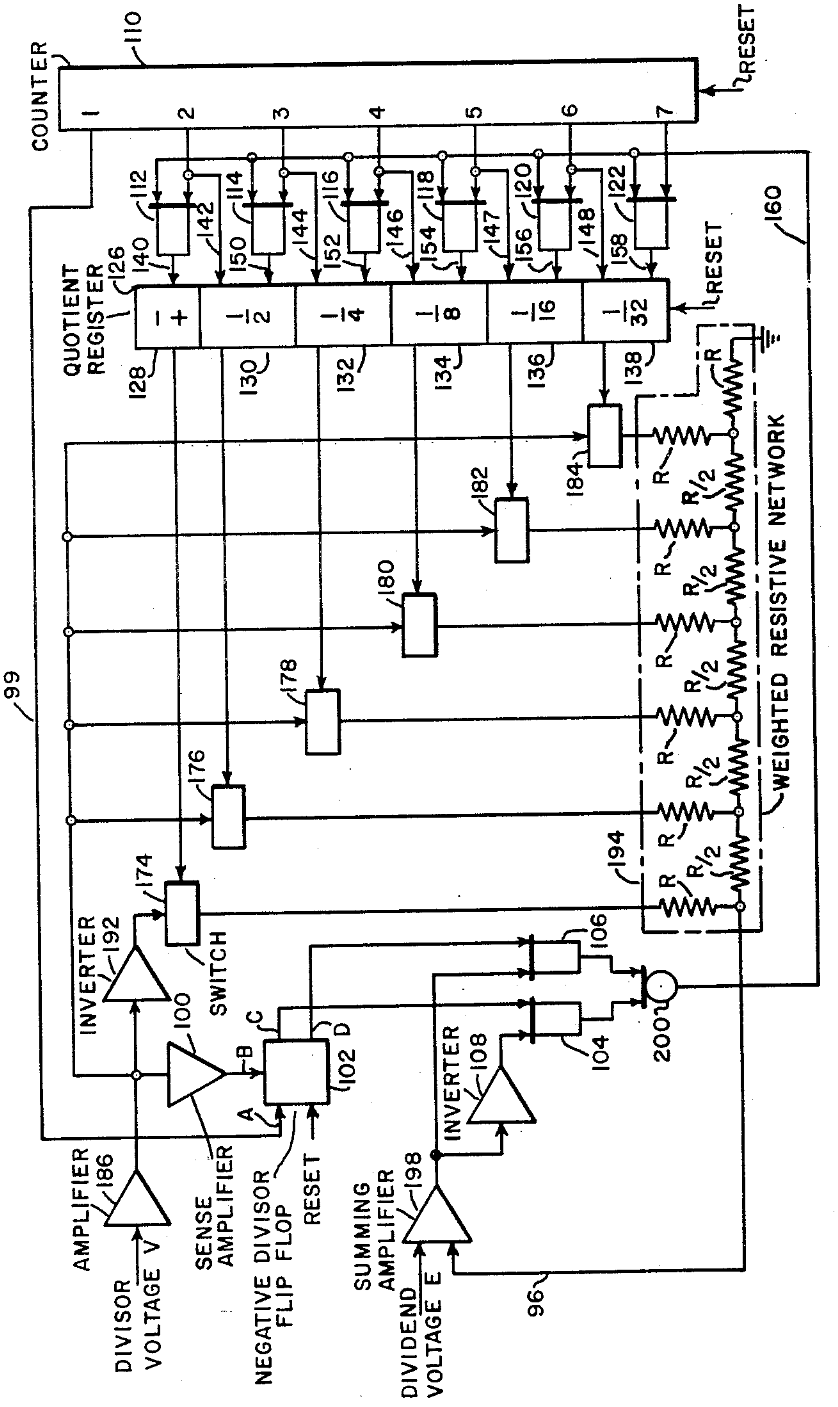
FIG. 3 is a schematic-block diagram of another embodiment of the present invention; and, FIGS. 4A and 4B are waveform diagrams to aid in the explanation of the operation of the embodiment shown in FIG. 3.

FIG. 3 provides an analog to digital divider capable of handling negative analog divisor voltages as well as negative dividend voltages. Reference should also be made to FIGS. 4A and 4B to aid in the understanding of the operation of the analog to digital divider of FIG. 3. Assume for purposes of example that the quotient register 26 starts in its reset condition and that the dividend voltage E is —25.1 volts and that the divisor voltage V is —32 volts. The steps of operation then are:

(1) The first cycle of operation is to determine whether the divisor voltage V is negative. At the time sequence 1, the counter 110 provides a ONE at output terminal 1 which passes through lead 99 to input terminal A of the negative divisor flip-flop 102. The negative divisor flip-flop 102 is designed so as to have a reset output at terminal C of ZERO and a ONE at terminal D. If, however, ONES appear at input terminals B and A the flip-flop is set so that the output at terminal C is a ONE and at terminal D is a zero. The negative divisor voltage V being applied to the amplifier 186 is inverted in the amplifier and applied to the sense amplifier 100. The sense amplifier 100, which may be an emitter or cathode follower does not invert the polarity of its input signal but provides an output signal of the same polarity; thus with a negative divisor voltage V a positive signal is applied from the sense amplifier 100 to input terminal B of the negative divisor flip-flop 102. This causes the flip-flop 102 to reset so that a ONE is applied to AND gate 104 and a zero is applied to AND gate 106.

(2) At time sequence 2, a ONE is applied to the set input 142 of the one-half flip-flop 130 of the quotient register 126. The one-half flip-flop 130 then provides an actuating signal to the switch 176 to permit the input divisor voltage V to pass therethrough. The output of the weighted resistive network 194 is then one-half times the divisor voltage V or 16 volts as shown in FIG. 4B. The algebraic sum of the inputs to the summing amplifier 198 is negative so it provides a ONE to the inverter 108 and to one input of the AND gate 106. As the other input to the AND gate 106 is supplied with a ZERO from the output terminal D of the negative divisor flip-flop 102, it does not provide an output signal to the OR gate 200. The ONE output of the summing amplifier is inverted in the inverter 108 thus appears as a zero input to the AND gate 104. Thus the AND gate 104 does not provide an output signal to the OR gate and so a ZERO is applied to the feedback loop 160. The one-half flip-flop 130 then remains in its set position. It should be noted that if either one but not both of the divisor voltage V and the dividend voltage E had been negative, the feedback path 160 would have supplied a ONE to the AND gate 112 to so set the sign flip-flop 128 to its negative set position.

(3) At time sequence 3, a ONE is applied to the one-fourth flip-flop 132 to set it and so activate switch 178. The output of the weighted resistive network is then 24 volts, but the algebraic sum of summing amplifier still being negative a ZERO is still applied to the feedback path 160 and the one-half and one-fourth flip-flops remain set.

(4) At the time interval 4, a ONE is provided to the one-eighth flip-flop 134 to set it and supply an activating signal to the switch 180. The weighted resistive network then provides a product signal of N times V or 28 volts to the summing amplifier 198. The algebraic sum of the summing amplifier's inputs now being positive, a zero is applied to the inverter 108 which in turn supplies a ONE to the AND gate 104. However, as the negative divisor flip-flop 102 is in its set position, a ONE is also applied to the AND gate 104 from the C terminal of the negative divisor flip-flop 102; therefore the AND gate 104 supplies a ONE to the OR gate 200. This in turn applies a ONE to the feedback path 160. See FIG. 4A.

(5) At time sequence 5, a ONE is applied to one input of the AND gate 118 which also has a ONE applied to its other terminal from the feedback path 160. Thus, the AND gate 118 applies a ONE signal to reset the one-eighth flip-flop 134. A ONE is applied also at this time to the one-sixteenth flip-flop 136 to set it and so activate the switch 182. The output from the weighted resistive network is then 26 volts, as shown in FIG. 4B. The algebraic sum of the inputs of the summing amplifier 198 remaining positive again applies a ONE to the feedback loop 160.

(6) At time sequence 6, a ONE is provided to an input of the AND gate 120 from the counter 110 and also to another input from the feedback path 160, and so the AND gate 120 is responsive to reset the one-sixteenth flip-flop 136. Also at this time the one-thirty-second flip-flop 138 is set and the gate 180 is responsive to pass the divisor voltage V to the weighted resistive network 194. The product signal then to the summing amplifier 198 is 25 volts. The negative algebraic sum of the inputs of the summing amplifier 198 causes the summing amplifier 198 to have a ONE output and so a ZERO appears on the feedback path 160.

(7) At time sequence 7, a ONE is applied to the AND gate 122. However, as a ZERO appears in the feedback path 160 the AND gate 122 is non-responsive to reset the one-thirty-second flip-flop 138. The digital number now in the quotient register 126 is $^{25}/_{32}$, which is the quotient within the accuracy of the quotient register of the dividend voltage E and the divisor voltage V. The digital settings in the quotient register 126 are shown in FIG. 4A.

The accuracy of the analog to digital dividers of FIGS. 1 and 3 can, of course, be increased by increasing the capacity of the quotient registers, the counters and adding additional switches and additional legs to the weighted resistive networks.

Although the present invention has been described with a certain degree of particularity, it should be understood that the present disclosure has been made only by way of example and that numerous changes in the details of the circuitry and the combination and arrangement of elements may be resorted to without departing from the scope and the spirit of the present invention.

We claim as our invention:

1. In analog to digital divider apparatus for producing digital signals representing the quotient of analog dividend signals and analog divisor signals, said apparatus being capable of handling either one of negative divisor and negative dividend signals, the combination of: quotient means operative to supply quotient signals in digital form; multiplying means operatively connected to receive said divisor signals in analog form and said quotient signals, and being operative to provide product signals of said quotient and divisor signals; feedback comparing means operatively connected to receive said dividend signals in analog form and said product signals, and being operative to supply error signals to correct said quotient signals to be indicative of the algebraic sign and magnitude of the quotient of said dividend and divisor signals; and sensing means operatively connected to said comparing means and being responsive to cause said dividend and product signals applied to said comparing means to be of opposite polarities.

2. A divider for producing a digital signal representing the quotient of an analog dividend signal and an analog divisor signal, said divider comprising a quotient register having a plurality of stages, one of said stages being an algebraic sign stage, means for operating said register stages in turn, means for multiplying the analog divisor signal with an analog signal the magnitude of which becomes progressively larger in decreasing incremental steps as said stages are operated in turn to produce a product signal, means for comparing the magnitude of said product signal with the magnitude of the dividend signal and for producing a feedback signal only when the magnitude of said product signal exceeds the magnitude of said dividend signal, and means controlled by said feedback signal for resetting the last stage operated in said quotient register whereby the final setting of said quotient register represents the digital value of the algebraic sign and magnitude of the quotient of said dividend and divisor analog signals.

3. In analog to digital divider apparatus for producing digital signals representing the quotient of analog dividend signals and analog divisor signals being capable of handling either one of negative dividend and negative divisor signals the combination of: quotient means operative to provide quotient signals in a digital number form; sequencing means operatively connected to said quotient means and being operative to control said quotient means; multiplying means operative to receive said divisor signals in analog form and said quotient signals, said multiplying means including a plurality of switching means operatively connected to said quotient means and operative to pass said divisor signals in response to said quotient signals, and a weighted resistive network operatively connected to said switching means and being operative to provide product signals of said divisor signals and said quotient signals; feedback comparing means operative to receive said dividend signals in analog form and being operatively connected to said resistive network to receive said product signals, said feedback comparing means being operative to supply error signals to said sequencing means in a relation to correct said quotient signals in digital number form to be indicative of the algebraic sign and magnitude of the quotient of said divisor and dividend signals in analog form; and sensing means operatively connected to said comparing means and being responsive to said signals applied to said comparing means to have opposite polarities.

References Cited by the Examiner

Instruments & Automation: vol. 30, 10/57, pages 1877–1880.

Palesky, "Hybrid Analog-Digital Computing Systems."

IBM Technical Disclosure Bulletin: vol. 2, No. 4, 12/59, pages 133 and 134.

MALCOM A. MORRISON, *Primary Examiner.*

WALTER W. BURNS, JR., *Examiner.*